3,379,512
PERFLUOROBOROSILANES AND METHODS
OF PREPARATION
John L. Margrave and Peter L. Timms, Houston, Tex., and
Thomas C. Ehlert, Milwaukee, Wis., assignors to R. I.
Patents, Inc., Houston, Tex., a corporation of Texas
No Drawing. Filed June 7, 1965, Ser. No. 462,099
7 Claims. (Cl. 23—367)

A non-exclusive, irrevocable, royalty-free license in the invention herein described, throughout the world for all purposes of the United States Government, with the power to grant sublicenses for such purposes, is hereby granted to the Government of the United States of America.

This invention relates to new perfluoroborosilane compounds and processes for preparing such compounds. More particularly, it is concerned with the compound $SiF_3$—$SiF_2$—$BF_2$ and its homologues, that is, with perfluoroborosilanes of the formula $SiF_3$—$(SiF_2)_n$—$BF_2$, wherein $n$ is an integer greater than 0, and with processes of preparing such compounds.

It is an object of the present invention to provide the hereinafter described compounds, characterized as perfluoroborosilanes. Another object of our invention is to provide processes for the preparation of said perfluoroborosilanes. Other objects will be apparent from the following detailed description of our invention and the appended claims.

For convenience, the formulae of the compounds of our invention will sometimes hereinafter be written as $Si_{n+1}BF_{2n+5}$, the value of $n$ depending upon the particular homologue. For example, $SiF_3$—$(SiF_2)_2$—$BF_2$ may be written $Si_3BF_9$, and so on.

The nomenclature of the compounds of our invention will be obvious to those skilled in the art. The compound $Si_2BF_7$ may, for example, be called perfluorodisilanyl boron difluoride or perfluoro-borodisilane, and $Si_3BF_9$ may be called perfluorotrisilanyl boron difluoride or perfluoro-1-borotrisilane.

The compounds of our invention are prepared by reacting silicon difluoride and boron trifluoride. Stated broadly, we have found that when a mixture of gaseous silicon difluoride and boron trifluoride is condensed, for example in a trap cooled by liquid nitrogen, compounds of the formula $SiF_3$—$(SiF_2)_n$—$BF_2$ are formed, these compounds consisting of $Si_2BF_7$ and its higher homologues.

The gaseous mixture may be obtained in a number of ways. It may, for example, be obtained by mixing gaseous boron trifluoride with gaseous silicon difluoride produced in the manner disclosed in the U.S. Patent to Pease, No. 2,840,588. Substantially in accordance with the method stated in that patent, silicon difluoride may be obtained by passing gaseous silicon tetrafluoride over solid elemental silicon, silicon carbide, polyvalent metal silicides, or metal/silicon alloys in a zone heated to at least 1000° C., the absolute pressure of the system being maintained at not more than 50 mm. of mercury. The temperature of the reaction zone should be not greater than the melting point of silicon, 1400° C.

The gaseous mixture may also be obtained by passing gaseous boron trifluoride over solid elemental silicon in a heated zone, the limits of the temperature of the reaction zone and pressure of the system being as described in the preceding paragraph. Alternatively, the gaseous mixture can be provided by passing gaseous silicon tetrafluoride over boron in a heated zone whose temperature is not less than 1000° C. nor greater than the melting point of boron, about 2000° C., in a system having an absolute pressure of not more than 50 mm. of mercury.

In either of these latter cases, i.e., $Si+BF_3$ or $B+SiF_4$, the gases emerging from the heated zone comprise a mixture of silicon difluoride and boron trifluoride which, upon condensation, yields the compounds of our invention.

The temperature of condensation is not critical, but must, of course, be less than the temperature of condensation of both the silicon difluoride and boron trifluoride contained in the gaseous mixture. Boron trifluoride being the more volatile of these two compounds, the condensation temperature should be less than that of $BF_3$, about −130° C. The mixture is most conveniently condensed in a trap cooled by liquid nitrogen, which has a temperature of about −196° C.

After the excess unreacted silicon difluoride and boron trifluoride have been removed from the vicinity of the condensate by pumping the same away at a temperature of about −90° C., the compounds of our invention may be separated from the condensate and obtained in gaseous state by warming the condensate to room temperature. When the volatile silicon-boron-fluorine compounds have been pumped away, a creamy-white porous Si—B—F polymer mass is left in the trap.

The yield of the volatile compounds is from 10 to 20% based on the weight of the silicon difluoride; rather less of the compounds were obtained from condensation of the gases resulting from the Si—$BF_3$ and B—$SiF_4$ reactions discussed above. The highest yields were obtained when care was taken to condense the boron trifluoride and silicon difluoride reactants at identical levels in the trap, so that they were well mixed.

The volatile compounds obtained from the trapped condensate in the manner described above were handled in a conventional high vacuum line fitted with greaseless stop cocks (made by Springhams of Harlow, Essex, England). The temporary ground joints in the system were lubricated with Kel-F grease, and Apiezon N grease was also fairly satisfactory. The silicone greases reacted rapidly with the boron-silicon-fluorine compounds, methyl fluorosilanes being among the compounds formed.

The volatile compounds were trapped in a liquid nitrogen trap, and three fractions were observed. The most volatile fraction was trapped in the range of −48° to −58° C., a second fraction at −18° to −28° C., and a small amount of a third, less volatile fraction was collected at −10° to +5° C. The relative amounts by weight of the three fractions were roughly 15:5:1.

The compounds contained in the three fractions were identified by mass spectrometric techniques. The mass spectrum of the −48° C. to −58° C. fraction showed it to be essentially a single substance containing only silicon, boron and fluorine. The vapor density of the fraction was measured as 201±2, and the molecular formula was established as $Si_2BF_7$.

The −18° to −28° C. fraction was also shown by its mass spectrum to be essentially a single substance containing silicon, boron and fluorine. The mass spectrum showed a molecular ion of mass 266 together with fragments indicative of the molecule $Si_3BF_9$.

The latest volatile fraction, collected at −10° to +5° C., showed a complex mass spectrum clearly showing the presence of $Si_4BF_{11}$ and $Si_5BF_{13}$, and fragments of higher compounds in the series. No compound of formula $SiBF_5$, corresponding to $SiF_3$—$BF_2$, was detected.

The mass spectra of the volatile compounds were taken with a Bendix Model 14–206A time-of-flight mass spectrometer, manufactured by the Bendix Corporation, Cincinnati, Ohio, and the data shown in Table I were obtained.

TABLE I

| m/e | Probable Identity | Relative Ion Abundances ($Si_2F_4^+=100$) | | | |
|---|---|---|---|---|---|
| | | $Si_2BF_7$ | | $Si_3BF_9$ | |
| | | 70 ev. | 17 ev. | 70 ev. | 17 ev. |
| 96 | $SiBF_3^+$ | 8.0 | 11.0 | 114 | 95 |
| 115 | $SiBF_4^+$ | 144 | 71 | 86 | 18.0 |
| 132 | $Si_2F_4^+$ | 100 | 100 | 100 | 100 |
| 151 | $Si_2F_5^+$ | 22.0 | 3.0 | 40 | 45 |
| 162 | $Si_2BF_5^+$ | <1.0 | | 6.6 | 7.0 |
| 181 | $Si_2BF_6^+$ | 59 | <1.0 | 28.5 | 12.1 |
| 198 | $Si_3F_6^+$ | | | 14.5 | 24.0 |
| 200 | $Si_2BF_7^+$ | | | | |
| 217 | $Si_3F_7^+$ | | | 2.2 | <0.1 |
| 247 | $Si_3BF_8^+$ | | | 23.8 | 6.2 |
| 266 | $Si_3BF_9^+$ | | | <1.0 | 4.7 |

The identity of the homologues $Si_4BF_{11}$ and $Si_5BF_{13}$ was established by mass spectrometric examination of a sample of the volatile compounds from which most of the $Si_2BF_7$ had been removed. The results of this examination are set forth in Table II.

TABLE II

| m/e | Identity | Ion Intensity | | |
|---|---|---|---|---|
| | | 70 ev. | 30 ev. | 15 ev. |
| 96 | $SiBF_3^+$ | 100 | 100 | 100 |
| 115 | $SiBF_4^+$ | 75 | 31 | 114 |
| 132 | $Si_2F_4^+$ | 88 | 105 | 103 |
| 151 | $Si_2F_5^+$ | 42 | 18 | 47 |
| 181 | $Si_2BF_6^+$ | 25 | 14 | 12 |
| 198 | $Si_3F_6^+$ | 13 | 19 | 25 |
| 217 | $Si_3F_7^+$ | 1.9 | 2.3 | 1.0 |
| 247 | $Si_3BF_8^+$ | 19 | 6.5 | 0.6 |
| 264 | $Si_4F_8^+$ | 4.2 | 6.0 | 5.0 |
| 266 | $Si_3BF_9^+$ | 2.0 | 2.4 | 4.0 |
| 283 | $Si_4F_9^+$ | 3.2 | 1.6 | |
| 302 | $Si_4F_{10}^+$ | | | 0.5 |
| 313 | $Si_4BF_{10}^+$ | 2.9 | 1.2 | 0.3 |
| 332 | $Si_4BF_{11}^+$ | 1.1 | 1.2 | 0.8 |
| 379 | $Si_5BF_{12}^+$ | 0.2 | <0.2 | Trace |
| 398 | $Si_5BF_{13}^+$ | 0.1 | 0.1 | 0.1 |

The infrared spectrum of $Si_2BF_7$, shown in Table III, was recorded with a Beckmann IR-9 instrument in a 10 cm. gas cell with KBr windows. The pressure of the compound in the evacuated cell was controlled by a cold trap connected directly to the cell, and maintained in the range of from 0.1 to 2.0 cm. of mercury absolute.

TABLE III

| Absorption, cm.$^{-1}$ | Intensity | Absorption, cm.$^{-1}$ | Intensity |
|---|---|---|---|
| 422 | Strong. | 1,005 | Moderate. |
| 639 | Weak. | 1,031 | Do. |
| 694 | Do. | 1,249 | Strong. |
| 722 | Do. | 1,287 | Moderate. |
| 844 | Strong. | 1,383 | Strong. |
| 847 | Do. | 1,449 | Moderate. |
| 896 | Moderate. | 1,461 | Do. |
| 945 | Do. | 1,502 | Weak. |
| 974 | Very strong. | 1,512 | Do. |

The structures of the compounds $Si_2BF_7$, $Si_3BF_9$ and their higher homologues were determined from nuclear magnetic resonance spectra, using a Varian HR-60 spectrometer operating at 19.25 Hz.($^{11}$B) and 56.4 Hz.($^{19}$F.). Chemical shifts and multiplet line separations were measured from the recorded traces calibrated by conventional side band techniques. The reference substances for chemical shift measurements were $CCl_3F$ for $^{19}F$ and $(C_2H_5)_2OBF_3$ for $^{11}B$. These substances were contained in separate tubes which were substituted for the sample tubes during the sweep to permit recording of sample and reference lines on the same spectrum.

The measurement of the $^{19}F$ and $^{11}B$ nuclear magnetic resonance spectra of liquid $Si_2BF_7$ and $Si_3BF_9$ yielded the results shown in Table IV.

TABLE IV

A. $^{19}F$ Spectra (ref. $CCl_3F=0$):

| Compound | Assignment | Chemical shift (p.p.m.) | $J_{Si-F(Hz)}$ | $J_{FSiSiF(Hz)}$ | $J_{BF(Hz)}$ | Remarks |
|---|---|---|---|---|---|---|
| $Si_2BF_7$ | $BF_2$ | 47.4±0.4 | | | (*) | Broad Quartet. |
| | $SiF_3$ | 126.6±0.6 | 351±5 | | | Unresolved Triplet. |
| | $SiF_2$ | 143.5±0.7 | | | | Broad Singlet. |
| $Si_3BF_9$ | $BF_2$ | 46.6±0.5 | | | | Broad Doublet. |
| | $SiF_3$ | 126.8±0.6 | 355±5 | 10.0±0.3 | | Triplet. |
| | $\beta$-$SiF_2$ | 141.8±0.6 | | 9.5±0.3 | | Sextet. |
| | $\alpha$-$SiF_2$ | 145.3±0.6 | | | | Broad Singlet. |

B. $^{11}B$ Spectra (ref. $BF_3O(C_2H_5)_2=0$):

| Compound | Chemical Shift | $J_{B-F(Hz)}$ | Remarks |
|---|---|---|---|
| $Si_2BF_7$ | −24.5±0.8 | | Broad Triplet. |
| $Si_3BF_9$ | −23.4±0.3 | 122±2 | Broad Singlet. |

*Spacing between the two inner lines is 139 Hz, spacing between the two outer lines 351 Hz. Indicated error limits are standard deviations.

Since the boron chemical shifts in both compounds were in the region of the shifts in $B_2F_4$ (−23 p.p.m.) and $HBF_2$ (−22 p.p.m.), it was strongly suggested that the boron was three coordinate, rather than four coordinate, which would be expected to show a boron chemical shift around 0 p.p.m. Furthermore, the boron resonance in $Si_2BF_7$ was a broad 1:2:1 triplet, separation about 121 Hz, indicating two directly bonded fluorine atoms. The broadness of the boron resonance is due to $^{11}B$ quadrupole relaxation. In $Si_3BF_{13}$ this relaxation almost completely obliterated the expected triplet structure, and the boron resonance appeared as a broad line with barely discernible shoulders.

In the fluorine spectrum of $Si_2BF_7$ the low field multiplet (47.4 p.p.m.) was a broad quartet of the type typically found in unsymmetrical fluoroboranes, and was assigned to the $-BF_2$ group. In the absence of quadrupole effects, the spectrum would be expected to consist of four equally spaced lines of equal intensity with separation equal to $J_{B-F}$. Quadruple relaxation of the $^{11}B$ nucleus could produce a partial collapse of the multiplet in such a way that the separation between the outer pairs of lines becomes smaller that the separation between the inner lines (T. C. Farrar and T. D. Coyle, J. Chem. Phys., 41, 2612 (1964); J. Bacon, R. J. Gillespie and J. W. Quail, Can. J. Chem., 41, 3063 (1963)), as was observed. In the corresponding multiplet of $Si_3BF_9$ (46.4 p.p.m.), the quadrupole collapse was more complete and the resonance appeared as a broad doublet. The extent to which these lines in the fluorine spectra of the two compounds were broadened parallels the broadening observed in the boron spectra. The chemical shifts of the boron-bonded fluorine atoms are somewhat lower than in most $X-BF_2$ compounds (T. D. Coyle, S. L. Stafford, and F. G. A. Stone, J. Chem. Soc., 3103 (1961)), but are very close to the shift in $B_2F_4$ (52 p.p.m.). The B-F fluorine absorption thus lies well below the region (CA 160 p.p.m.) of fluorine atoms bonded to four coordinate boron atoms.

The remaining lines in the fluorine spectrum of $Si_2BF_7$, at 126.6 and 143.5 p.p.m., were assigned respectively to the $SiF_3$ and $SiF_2$ groups on the basis of intensities and comparison of the chemical shift values with perfluorotrisilane, $Si_3F_8$. These lines were broad envelopes with a suggestion of triplet structure in the $SiF_3$ peak most probably caused by coupling with the adjacent $SiF_2$ fluorine atoms. The broadening observed is due to a combination of coupling of the fluorine with the boron, and the quadrupole relaxation of the boron. A similar effect has been observed in perfluorovinylboron compounds (T. D. Coyle, S. L. Stafford and F. G. A. Stone, Spectrochim Acta, 17, 968 (1961)).

In the fluorine spectrum of $Si_3BF_9$, the high field resonance was assigned to the $\alpha$-$SiF_2$ group on the basis of its chemical shift and the similarity in appearance to the corresponding line in $Si_2BF_7$. The intensity and chemical shift of the resonance at 126.8 p.p.m. clearly indicated that it was due to one $SiF_3$ group. The triplet structure arose from coupling with the adjacent $SiF_2$ group; and $J_{FSiSiF}$ was about 10 Hz, close to the value found in $Si_3F_8$. As only one $SiF_3$ group was present, the compound obviously could not have the structure $SiF_3$—$SiF_2$—$BF$—$SiF_3$. The remaining resonance at 141.8 p.p.m., assigned to the $\beta$-$SiF_2$ group, was a sextet with intensities approximately in the ratio 1:5:10:10:5:1. This may have arisen from accidental overlap of lines arising from the coupling of the $\beta$-$SiF_2$ fluorine atoms to the $SiF_3$ and the $\alpha$-$SiF_2$ fluorine atoms. If these two coupling constants were almost equal, the expected quartet of triplets would overlap to give the observed spectrum. Spectra taken under high magnification suggested that this overlap is not perfect, supporting the above explanation.

It will be noted that the infrared specrum of $Si_2BF_7$ (Table III, supra) agrees with the structure $SiF_3$—$SiF_2$—$BF_2$. The group of bands in the 800–900 and 970–1030 cm.$^{-1}$ regions are characteristic of the perfluorosilanes, and the bands in the 1200–1500 cm.$^{-1}$ region are found in other compounds containing $BF_2$ groups, such as $B_2F_4$ and $BrBF_2$.

The compounds $Si_2BF_7$, $Si_3BF_9$ and their homologues are colorless liquids at room temperature. $Si_2BF_7$ has a melting point of 0° C., and a boiling point of 42° C.; $Si_3BF_9$ has a melting point of 11 to 12° C., and a boiling point of 85° C. The compounds ignite spontaneously in air burning with a bright green flame. They are rapidly but incompletely hydrolyzed by water, forming a white mass which will evolve some silanes on treatment with aqueous hydrofluoric acid.

The compounds are thermally stable to at least 200° C. in the vapor state. At higher temperatures slow decomposition to oily polymers takes place. When a sample of $Si_2BF_7$ was passed through a Pyrex tube packed with quartz wool at 500° C. in a fast stream of helium, most of the compounds was decomposed, boron trifluoride being the main gaseous product. Crystalline polymers were deposited along the tubing beyond the hot zone, and some silicon was deposited on the quartz wool. Since no perfluorosilanes were formed, the first stage in decomposition may be the transfer of fluorine from silicon to boron, followed by polymerization of the resulting $Si_2F_4$ moiety, i.e.:

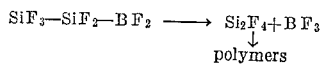

At 700° C. there was rapid and complete decomposition of $Si_2BF_7$ to silicon, silicon tetrafluoride, and boron trifluoride.

The reaction of $Si_2BF_7$ with iodine is slow and complex. With excess iodine at elevated temperatures, boron triiodide, boron trifluoride, silicon tetraiodide (tetraiodosilane), and silicon tetrafluoride were the end products.

With less iodine, silicon hexafluoride (hexafluorodisilane) was isolated in good yield, suggesting that the primary attack of the iodine is on the Si–B bond rather than the Si—Si bond.

Triethylamine reacts smoothly at low temperatures with $Si_2BF_7$ to form a liquid complex $Si_2BF_7 \cdot N(C_2H_5)_3$. This complex is rather involatile, but its identity was first established mass spectrometrically from the presence of the ions $SiBF_4N(C_2H_5)_3^+$ (mass 216), $Si_2BF_7^+$ (mass 200) and other smaller fragments. No molecular ion was observed. On standing for a few hours, the liquid complex became dark brown in color and very viscous, but it has remained in this form without further decomposition for many months at room temperature.

An explosion occurred when liquid carbon monoxide was condensed onto solid $Si_2BF_7$. However, in the vapor state reaction is slow even at elevated temperatures and results in a very complicated mixture of compounds including some perfluorosilanes, and one compound of molecular formula $Si_2BF_5CO$.

There was no reaction between tetrafluoroethylene and $Si_2BF_7$ in the gas phase at temperatures up to 130° C.

The polymer remaining in the liquid nitrogen trap after the volatile compounds of our invention have been removed contains only a few percent of boron. It is a brittle white solid which can be handled only in a dry nitrogen atmosphere, being exceedingly inflammable in air. On heating the polymer to 150° C. under vacuum, it first loses some volatile silicon-boron-fluorine compounds, species up to $Si_5BF_{13}$ being detected mass spectrometrically, but on further heating to 250° C. it behaves more like a silicon difluoride polymer evolving only perfluorosilanes from silicon tetrafluoride to at least $Si_{13}F_{28}$.

There are three interesting facts about the reaction between boron trifluoride and silicon difluoride which gives clues to its possible mechanism:

(1) Gaseous boron trifluoride has not been observed to react with silicon difluoride. The rate of decay of silicon difluoride gas at room temperature in the presence of boron trifluoride is only slightly faster than in the presence of an equal pressure of nitrogen. Furthermore, when a mixture of equal amounts of silicon difluoride and boron trifluoride gas were passed through a cooled tube at a total pressure of 0.2 mm. of mercury absolute, the gases did not react until the dew point of the boron trifluoride, about −160° C., was reached, even though the silicon difluoride was fully condensed below −70° C.

(2) The formation of silicon-boron-fluorine compounds is dependent on the boron trifluoride being present at the moment that the silicon difluoride condenses. For example, when boron trifluoride was condensed on a layer of silicon difluoride which had been condensed a few seconds previously at −196° C., no such compounds were formed. However, when silicon difluoride was condensed on a layer of boron trifluoride at −196° C., detectable amounts of $Si_2BF_7$ and its homologues were formed.

(3) No $SiBF_5$ is formed. The simplest compound which is formed, $Si_2BF_7$, contains a Si—Si bond.

The most probable explanation of these facts is that the first step in the reaction of silicon difluoride and boron trifluoride is the dimerization of the silicon difluoride to form a diradical of unsaturated species, $Si_2F_4$. This species adds on additional $SiF_2$ groups rapidly to form $Si_3F_6$, $Si_4F_8$, ... $(SiF_2)_n$, where $n$ may be as great as 20. Boron trifluoride may add on to these "unsaturated" compounds to form intermediates like $Si_2F_4 \cdot BF_3$ which could rearrange to $Si_2BF_7$, as follows:

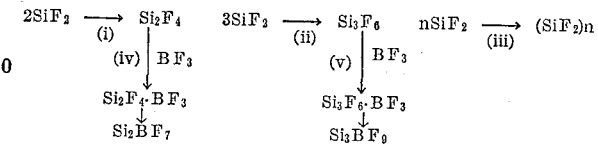

If reaction (iii) is very rapid compared with reactions (iv) and (v), much $Si_2BF_7$ and $Si_3BF_9$ will only be formed in the presence of condensed boron trifluoride at low temperatures. It has been observed that yields fall rapidly along the series $Si_2BF_7$, $SiS_3BF_9$, $Si_4BF_{11}$, $Si_5BF_{13}$, which is as expected since reaction (iv) should be faster than (v) and so on.

The compounds of our invention, $Si_2BF_7$ and its homologues, are useful as a convenient means for depositing an adherent layer of silicon on glass or metal objects. Such layers are of value in, for example, providing excellent oxidation and corrosion resistance for metals on which they are coated.

$Si_2BF_7$ and its homologues form complexes with many amines. The complexes formed with tertiary amines are particularly stable, and may be kept indefinitely if not in the presence of moisture. The complex of $Si_2BF_7$ and triethylamine described above, acts as a catalyst for the hardening of epoxide type resins, having rapid action and forming solid polymers which have some of the properties exhibited by polymers formed with conventional catalysts, whose action is much slower.

$Si_2BF_7$ and its homologues will dissolved smoothly in ethers, giving soluble complexes, the solutions thus formed being very reactive. A solution of $Si_2BF_7$ and $Si_3BF_9$ in diethyl ether was found to cause the immediate polymerization of certain aldehydes, particularly furfuraldehyde, to form a black polymer which retains some silicon and boron. This polymer resists complete combustion, and is of use in ablation studies.

A solution of $Si_2BF_7$ and/or its homologues in acetone has been found to be a powerful reducing agent. With nitrobenzene, a vigorous reaction occurred, and aniline was yielded upon the addition of water.

The following examples are illustrative of our invention:

Example I

Silicon difluoride was prepared by passing silicon tetrafluoride over pea-sized lumps of crystalline silicon. A column of the silicon was supported on a plug of quartz wool inside a vertically mounted quartz tube, and a Kanthal wound electrical resistance furnace was arranged around the quartz tube so that the silicon was heated to 1150° C. Silicon tetrafluoride, obtained from the Matheson Company, 99% pure, was passed over iron powder at 800° C. to remove sulphur and oxygen impurities, and was then passed through the column of silicon from the bottom at a controlled rate. By vacuum pumping the pressure at the upper end of the quartz tube was maintained at 0.1–0.3 mm. of mercury absolute. The gases emerging from the quartz tube contained silicon difluoride and silicon tetrafluoride.

Boron trifluoride, obtained from the Matheson Company and nominally 99.5% pure, was introduced into the gas stream emerging from the furnace (and containing both $SiF_2$ and excess unreacted $SiF_4$) through a needle valve. The absolute pressure in this region was maintained at 0.2–0.3 mm. of mercury, and the $BF_3$ was introduced in such amount that the mole ratio of $BF_3$ to $SiF_2$ was at least 2:1.

The gaseous mixture was condensed in a cold trap cooled by liquid nitrogen. After 10–15 g. of the mixture had been condensed over a period of about 2 hours, the excess unreacted $SiF_4$ and $BF_3$ were pumped away at −90° C. The condensate temperature was then raised to room temperature while pumping to remove the volatile fractions containing the compounds of our invention. A porous, creamy white polymer mass was left in the trap. The volatile fractions were trapped at three different temperature ranges and analyzed mass spectrometrically, as described above in connection with Tables I, II, III and IV.

Example II

Crystalline silicon was placed within a graphite tube enclosed by an evacuated quartz envelope which was connected to a high vacuum system via a liquid nitrogen cooled cold trap. Boron trifluoride gas was passed over the silicon while the tube was inductively heated to 1150° C., the absolute pressure of the system being maintained at 0.1–0.3 mm. of mercury. The gases emerging from the furnace included both $SiF_2$ and excess $BF_3$, and the gaseous mixture was condensed in the cold trap.

The condensate was handled in the manner described in Example I above, and yielded both the creamy white polymer and volatiles which, upon mass spectrometric examination, were determined to consist of $Si_2BF_7$, $Si_3BF_9$, and their higher homologues.

Example III

Using the same apparatus as in Example II, elemental boron was placed within the graphite tube and gasous silicon tetrafluoride was passed thereover. Several runs were made while maintaining the same pressure of the system as in Example II, the tube temperature for each run being maintained substantially constant. Maximum tube temperature used was about 1700° C., and the minimum, about 1000° C. The gases emerging from the furnace during each run included both $SiF_2$ and $BF_3$, and were condensed in the cold trap. The condensate from each run was analyzed as set forth in Example I and II, and yielded both the polymer and the volatile Si—B—F compounds of our invention.

Example IV

When boron trichloride was used in place of boron trifluoride in the procedure described in Example I, condensation of the gas mixture at −196° C. yielded a bright blue deposit. On warming this deposit to room temperature, excess silicon tetrafluoride was pumped away and a number of other volatile liquid factions were obtained together with a residue of a white polymer which was spontaneously inflammable. Mass spectrometric investigation of the liquid fractions showed that there had been an extensive exchange of fluorine and chlorine between the silicon and boron. No iron containing boron was observed except $BF_2+$. However, the predominance at low electron voltages of ions of the type $Si_nF_{2n-z}Cl_z+$ suggests that compounds of the type $Si_nF_{2n+1-z}Cl_zBF_{2-x}Cl_x$, where $x$ equals 2 to 0 and $z$ was observed to be between 3 and 0, were present in the mixture, as both $Si_2BF_7$ and $Si_3BF_9$ readily gave $Si_2F_4+$ and $Si_3F_6+$ respectively on electron impact.

The following example illustrates the use of $Si_2BF_7$ in depositing a layer of silicon on metal:

Example V

Pieces of 1/16 inch diameter iron rod were placed in a quartz tube and heated to 500° C. in an atmosphere of helium. $Si_2BF_7$ vapor was then passed over the pieces of iron in a stream of helium for a few minutes. It was found that the iron was coated with an adherent layer of silicon which protected the underlying iron from oxidation and corrosion.

Various changes and modifications of the invention can be made and, insofar as such variations incorporate the true spirit of this invention, they are intended to be incorporated within the scope of the appended claims.

We claim as our invention:

1. A perfluoroborosilane compound of the formula:

wherein $n$ is an integer greater than 0.

2. Perfluorodisilanyl boron difluoride.
3. Perfluorotrisilanyl boron difluoride.
4. A process for preparing perfluoroborosilanes, comprising the step of condensing a mixture of gaseous boron trifluoride and gaseous silicon difluoride at a temperature below the condensation temperature of each of said compounds.
5. The process of claim 4, including the step of preparing said mixture by introducing gaseous boron trifluoride into a gaseous stream consisting essentially of silicon difluoride and silicon tetrafluoride.

6. The process of claim 4, including the step of preparing said gaseous mixture by bringing gaseous boron trifluoride into contact with elemental silicon at a temperature of from about 1000° C. to about 1400° C.

7. The process of claim 4, including the step of preparing said mixture by bringing gaseous silicon tetrafluoride into contact with elemental boron at a temperature of from about 1000° C. to about 2000° C.

No references cited.

MILTON WEISSMAN, *Primary Examiner.*